United States Patent
Yamamoto et al.

(10) Patent No.: US 10,026,152 B2
(45) Date of Patent: Jul. 17, 2018

(54) IMAGE PROCESSING APPARATUS FOR PROVIDING VISIBILITY OF AN IMAGE WHILE MAINTAINING COLOR IN A NATURAL STATE

(71) Applicant: FUJI XEROX CO., LTD., Tokyo (JP)

(72) Inventors: Takayuki Yamamoto, Kanagawa (JP); Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 4 days.

(21) Appl. No.: 15/249,993

(22) Filed: Aug. 29, 2016

(65) Prior Publication Data
US 2017/0206636 A1    Jul. 20, 2017

(30) Foreign Application Priority Data
Jan. 18, 2016  (JP) .................................. 2016-007311

(51) Int. Cl.
  *G06K 9/00* (2006.01)
  *G06T 5/00* (2006.01)
  (Continued)

(52) U.S. Cl.
  CPC ............. *G06T 5/00* (2013.01); *H04N 1/6063* (2013.01); *H04N 1/628* (2013.01); *G06T 2207/20112* (2013.01)

(58) Field of Classification Search
  CPC . G06T 2207/10024; G06T 5/008; G06T 5/00; G06K 9/4652; G06K 15/1878;
  (Continued)

(56) References Cited

U.S. PATENT DOCUMENTS 6,072,496 A  *  6/2000  Guenter ............. G06K 9/00201
                                                      345/419
2004/0057614 A1    3/2004  Ogatsu et al.
(Continued)

FOREIGN PATENT DOCUMENTS

JP    2004-112694 A    4/2004
JP    2006-135628 A    5/2006
(Continued)

OTHER PUBLICATIONS

Ron Kimmel, et al., "A Variational Framework for Retinex", International Journal of Computer Vision, 2003, pp. 7-23, vol. 52, No. 1, (published before this application Aug. 2016).
(Continued)

*Primary Examiner* — Eueng-Nan Yeh
(74) *Attorney, Agent, or Firm* — Sughrue Mion, PLLC

(57) ABSTRACT

An image processing apparatus includes a first-image generation unit that generates a first image by performing a visibility enhancement process on an original image in a first color space that is a color space not prone to having color values falling outside a color gamut as a result of conversion of color values of pixels in the original image in the visibility enhancement process, a representative chromaticity determination unit that determines a representative chromaticity that represents chromaticities of pixels in a first region that is an entirety or a part of one of the original image and the first image, and a second-image generation unit that generates a second image by performing, in a second color space, a process for adjusting color values of pixels in a second region that is the entirety or the part of the first image to make the representative chromaticity close to a target chromaticity.

8 Claims, 10 Drawing Sheets

(51) Int. Cl.
*H04N 1/62* (2006.01)
*H04N 1/60* (2006.01)

(58) Field of Classification Search
CPC .... H04N 1/6077; H04N 1/32309; H04N 1/60; H04N 1/00082
See application file for complete search history.

(56) References Cited

U.S. PATENT DOCUMENTS

| 2004/0239814 A1* | 12/2004 | Hirashima | H04N 1/628 |
| | | | 348/649 |
| 2005/0264837 A1* | 12/2005 | Shimada | H04N 1/56 |
| | | | 358/1.9 |
| 2006/0119910 A1 | 6/2006 | Sasaki | |

FOREIGN PATENT DOCUMENTS

| JP | 2011-86976 A | 4/2011 |
| JP | 2014-211914 A | 11/2014 |

OTHER PUBLICATIONS

Daniel J. Jobson, et al., "A Multiscale Retinex for Bridging the Gap Between Color Images and the Human Observation of Scenes", IEEE Transactions on Image Processing, Jul. 1997, pp. 965-976, vol. 6, No. 7.

* cited by examiner

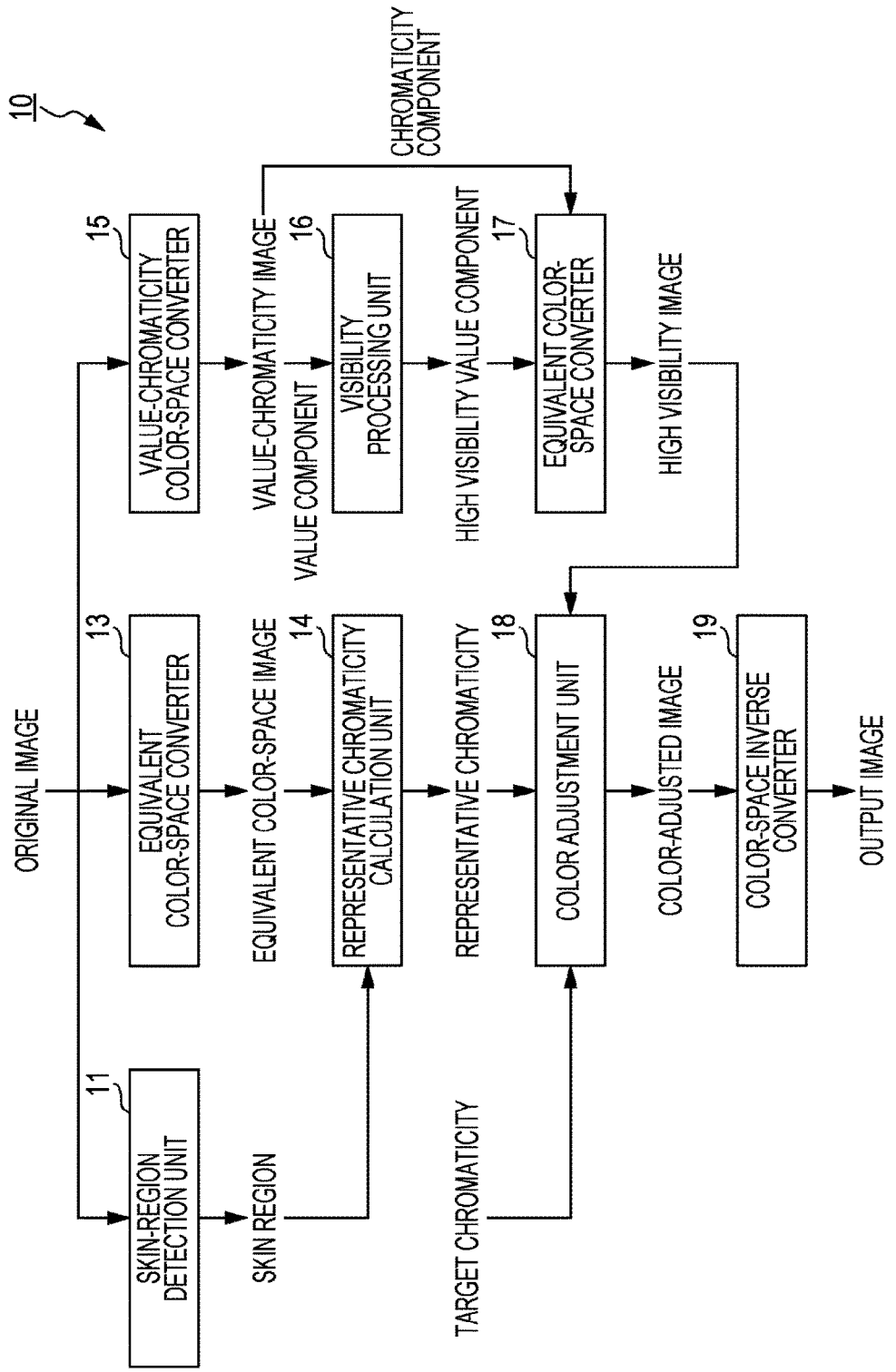

IMAGE PROCESSING APPARATUS FOR PROVIDING VISIBILITY OF AN IMAGE WHILE MAINTAINING COLOR IN A NATURAL STATE

CROSS-REFERENCE TO RELATED APPLICATIONS

This application is based on and claims priority under 35 USC 119 from Japanese Patent Application No. 2016-007311 filed Jan. 18, 2016.

BACKGROUND

Technical Field

The present invention relates to an image processing apparatus, a non-transitory computer readable medium, and an image processing method.

SUMMARY

According to an aspect of the invention, there is provided an image processing apparatus including a first-image generation unit, a representative chromaticity determination unit, and a second-image generation unit. The first-image generation unit generates a first image by performing a visibility enhancement process for enhancing visibility of a subject in an original image. The visibility enhancement process is performed on the original image in a first color space that is a color space not prone to having color values that fall outside a color gamut as a result of conversion of color values of pixels in the original image performed in the visibility enhancement process. The representative chromaticity determination unit determines a representative chromaticity that represents chromaticities of pixels in a first region that is an entirety or a part of one of the original image and the first image. The second-image generation unit generates a second image by performing, in a second color space that is an equivalent color space, a process for adjusting color values of pixels in a second region that is the entirety or the part of the first image to make the representative chromaticity close to a target chromaticity.

BRIEF DESCRIPTION OF THE DRAWINGS

Exemplary embodiments of the present invention will be described in detail based on the following figures, wherein:

FIG. 1 is a block diagram illustrating an example functional configuration of an image processing apparatus in a first exemplary embodiment;

DETAILED DESCRIPTION

Figure 2A:
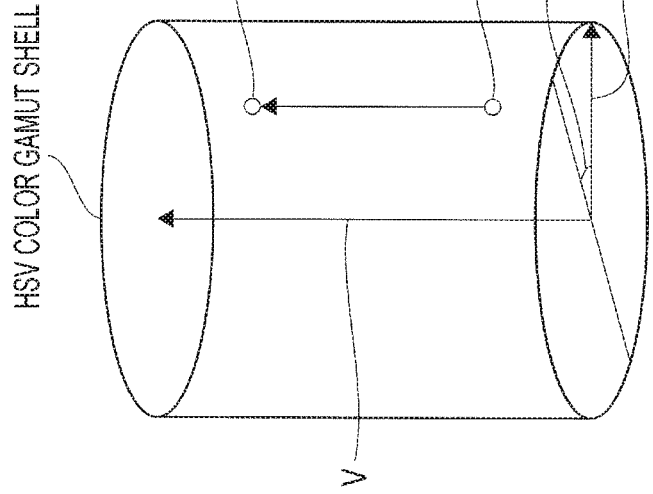
FIG. 2A is a diagram illustrating a color gamut shell of a hue, saturation, and value (HSV) color space.

Hereinafter, exemplary embodiments will be described in detail with reference to the drawings.

First Exemplary Embodiment

FIG. 1 is a block diagram illustrating an example functional configuration of an image processing apparatus 10 in a first exemplary embodiment. In the first exemplary embodiment, color reproduction is appropriately performed in a region corresponding to the skin of a subject (hereinafter, referred to as a "skin region") with memory color taken into consideration, and the visibility is also enhanced. In the first exemplary embodiment, particularly a case of calculating a representative chromaticity only from the original image will be described. As illustrated in FIG. 1, the image processing apparatus 10 in the first exemplary embodiment includes a skin-region detection unit 11, an equivalent color-space converter 13, a representative chromaticity calculation unit 14, a value-chromaticity color-space converter 15, a visibility processing unit 16, an equivalent color-space converter 17, a color adjustment unit 18, and a color-space inverse converter 19.

The skin-region detection unit 11 extracts a skin region from a red, green, and blue (RGB) image that is the original image.

First, to separate a portion needing color adjustment for increasing favorableness in a memory color region, the skin-region detection unit 11 obtains a pixel value $(x1_{i,j}, x2_{i,j})$ resulting from coordinate conversion that is performed in accordance with Formula (1) on an RGB value $I_{i,j}=(R_{i,j}, G_{i,j}, B_{i,j})$ of each pixel in the original image.

$$(x1_{i,j}, x2_{i,j}) = \left(\frac{G_{i,j}}{R_{i,j}}, \frac{B_{i,j}}{R_{i,j}}\right) \quad (1)$$

The skin-region detection unit 11 subsequently obtains a pixel value (x1,x2) resulting from the coordinate conversion performed in accordance with Formula (2) on an RGB value $\hat{I}=(\hat{R}, \hat{G}, \hat{B})$ of a skin color (hereinafter, referred to as a "reference skin color") serving as a reference that is set in advance as a fixed parameter. Note that a caret symbol is provided above a character in Formula (2) but follows the character in the description.

$$(x1, x2) = \left(\frac{\hat{G}}{\hat{R}}, \frac{\hat{B}}{\hat{R}}\right) \quad (2)$$

The skin-region detection unit 11 subsequently obtains a distance $d_{i,j}$ between the pixel values in accordance with Formula (3) and detects a location (i,j) of a pixel having a distance $d_{i,j}$ equal to or smaller than a predetermined threshold as the location of a pixel belonging to the skin region.

$$d_{i,j} = \sqrt{(x1-x1_{i,j})^2 + (x2-x2_{i,j})^2} \quad (3)$$

Although a Boolean method to express whether pixels belong to the skin region on a per-pixel basis has been described, a method for expressing whether a pixel belongs to the skin region is not limited to the Boolean method. For example, weightings $w_{i,j}$ each indicating the degree to which the corresponding pixel belongs to the skin region may be used. Each weighting $w_{i,j}$ is calculated by applying the function in Formula (4). In Formula (4), p is the maximum gradient of the function, and $d_{inf}$ is a parameter for an inflection point of the function.

$$w_{ij} = \frac{1}{1 + \left(\frac{d_{i,j}}{d_{inf}}\right)^p} \quad (4)$$

In the description, the reference skin color is set in advance as the fixed parameter, but a user may designate the reference skin color. In this case, the user may designate the reference skin color by using a numerical value expressing a color or a pixel in the image.

In the exemplary embodiment, the skin-region detection unit 11 is provided as an example of a region determination unit that determines a first region as a region including a pixel having a color value within a predetermined range from the color value of the memory color.

The equivalent color-space converter 13 converts an RGB image that is the original image into an image in an equivalent color space having a coordinate system equivalent to human perception (hereinafter, referred to as an "equivalent color-space image"). The equivalent color space is herein a CIE Lab color space, and the equivalent color-space image is an L*a*b* image.

In the exemplary embodiment, the CIE Lab color space is used as an example of a second color space that is the equivalent color space.

The representative chromaticity calculation unit 14 calculates a representative chromaticity $C_s$ from chromaticities $C(a^*,b^*)$ of pixels in the equivalent color-space image.

Specifically, when receiving Boolean values indicating whether the pixels belong to the skin region from the skin-region detection unit 11, the representative chromaticity calculation unit 14 calculates, as in Formula (5), a mean (arithmetic mean) of the chromaticities $C(a^*,b^*)$ of the pixels in the skin region in the equivalent color-space image and sets the value as the representative chromaticity $C_s$.

$$C_s = \frac{\sum_s C(a*, b*)}{n_s} \quad (5)$$

When receiving each weighting $w_{i,j}$ indicating the degree to which the corresponding pixel belongs to the skin region from the skin-region detection unit 11, the representative chromaticity calculation unit 14 calculates, as in Formula (6), a weighted mean of the chromaticities $C(a^*,b^*)$ of the pixels in the equivalent color-space image and sets the weighted mean as the representative chromaticity $C_s$.

$$C_s = \frac{\sum_s (w_{i,j} C(a*, b*))}{\sum_s w_{i,j}} \quad (6)$$

In Formulas (5) and (6), $\Sigma_s$ denotes the sum in the skin region, and $n_s$ denotes the number of pixels in the skin region.

If the Boolean values indicating whether the pixels belong to the skin region are delivered from the skin-region detection unit 11, a region in which the representative chromaticity calculation unit 14 is to perform the processing is part of the image. If the weightings $w_{i,j}$ each indicating the degree to which the corresponding pixel belongs to the skin region are delivered from the skin-region detection unit 11, the region in which the representative chromaticity calculation unit 14 is to perform the processing is the entirety of the image. That is, in the exemplary embodiment, the region in which the representative chromaticity calculation unit 14 is to perform the processing is used as an example of the first region that is the entirety or a part of the image. The representative chromaticity calculation unit 14 is provided as an example of a representative chromaticity determination unit that determines a representative chromaticity that represents the chromaticities of pixels in the first region.

The value-chromaticity color-space converter 15 converts the RGB image that is the original image into a value-chromaticity image in a color space having value and chromaticity components (hereinafter, referred to as a "value-chromaticity color space"). The value-chromaticity color space is herein an HSV color space, and the value-chromaticity image is an HSV image. That is, the value-chromaticity color-space converter 15 converts the RGB image into the HSV image in accordance with the following formulas (7), (8), and (9). In the following formulas (7), (8), and (9), max denotes the maximum value of each of R, G, and B values of each pixel, and min denotes the minimum value of each of the R, G, and B values of each pixel. In addition, H denotes hue, S denotes saturation, and V denotes value.

$$H = \begin{cases} 60 * \left(\frac{B-G}{\max - \min}\right), & \text{if } (R = \max) \\ 60 * \left(2 + \frac{R-B}{\max - \min}\right), & \text{if } (G = \max) \\ 60 * \left(4 + \frac{G-R}{\max - \min}\right), & \text{if } (B = \max) \\ 0, & \text{if } (\max = \min) \end{cases} \quad (7)$$

$$S = \begin{cases} \frac{\max - \min}{\max}, & \text{if } (\max! = 0) \\ 0, & \text{if } (\max = 0) \end{cases} \quad (8)$$

$$V = \max \quad (9)$$

Figure 2B:
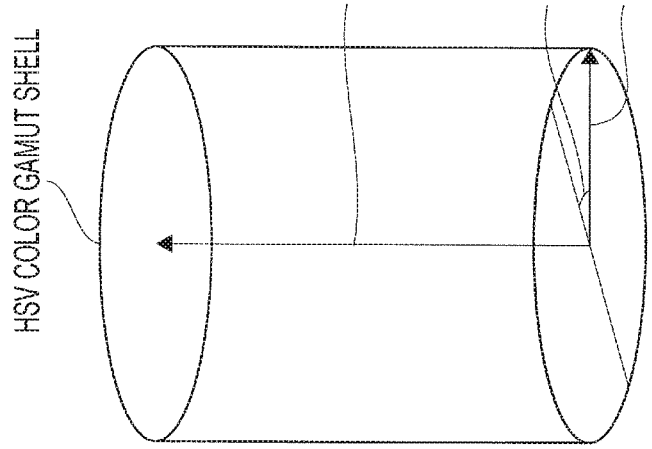
FIG. 2B is a diagram illustrating a relationship among the color gamut shell of the HSV color space, an HSV value before color adjustment, and an HSV value after the color adjustment.

As described above, it is effective to use the HSV color space in a visibility enhancement process for enhancing visibility (hereinafter, referred to as a "visibility process"). This is because the HSV color space is suitable for the visibility process in the following two points. The first point is that the sRGB color gamut of the HSV color space forms a columnar space as illustrated in FIG. 2A, and adjustment of the value V thus does not result in the value V falling outside the color gamut as illustrated in FIG. 2B. The second point is that colors are prevented from becoming unnatural compared with processing without converting the RGB image.

Figure 3A:
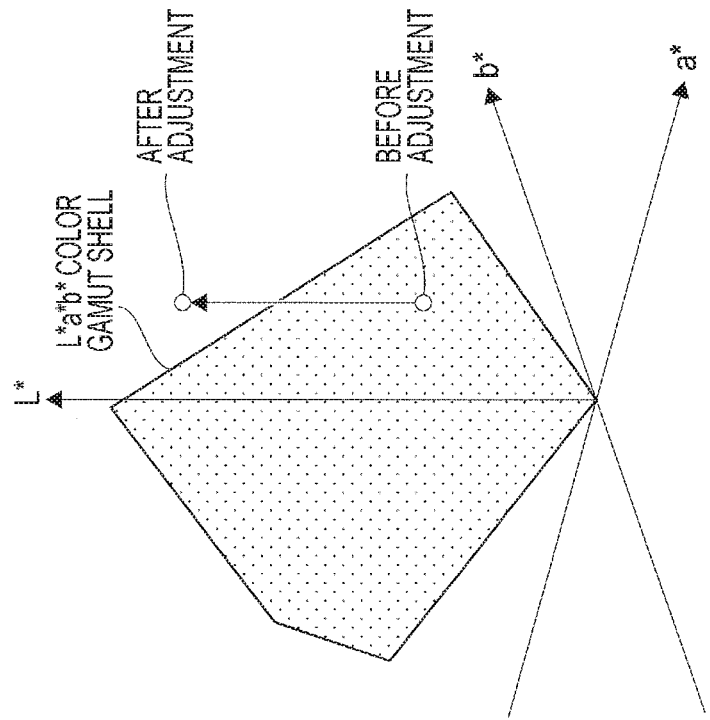
FIG. 3A is a diagram illustrating a color gamut shell of an L*a*b* color space.
Figure 3B:
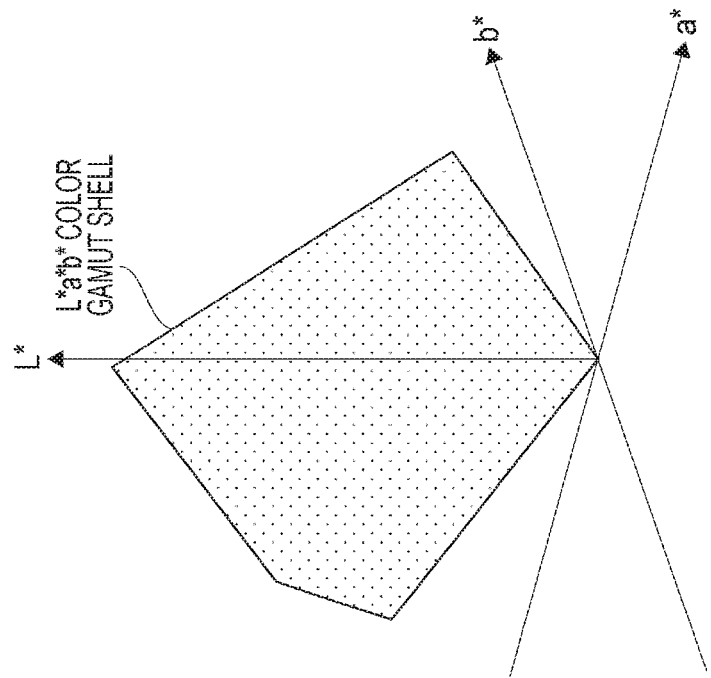
FIG. 3B is a diagram illustrating a relationship among the color gamut shell of the L*a*b* color space, an L*a*b* value before the color adjustment, and an L*a*b* value after the color adjustment.

In contrast, if the visibility process is performed in the equivalent color space, for example, the sRGB color gamut of the CIE Lab color space is approximately shaped as illustrated in FIG. 3A, and adjustment of the L* value results, in some cases, in the L* value falling outside the color gamut, as illustrated in FIG. 3B.

Note that a color space suitable for the visibility process is herein the color space in which the value adjustment does not result in a value falling outside the color gamut, but the suitable color space is not limited thereto. For example, even if the value adjustment in a color space results in a value falling outside the color gamut, the color space may be suitable as long as the degree of deviation from the color gamut is small and has almost no influence on the result of the visibility process. That is, in the exemplary embodiment, the HSV color space is used as an example of a first color space that is a color space not prone to having color values that fall outside the color gamut as a result of conversion of the color values of pixels in the original image performed in the visibility enhancement process.

The visibility processing unit 16 performs the visibility process based on the retinex principle on the value component out of the components of the thus acquired value-chromaticity image. The details of the visibility processing unit 16 will be described later. In this way, the visibility processing unit 16 generates and outputs a high visibility value component.

The equivalent color-space converter 17 converts the image having the high visibility value component thus acquired and the unprocessed chromaticity (hue and saturation) component acquired from the value-chromaticity image into a high visibility image in the CIE Lab color space that is the equivalent color space.

In the exemplary embodiment, the high visibility image is used as an example of a first image. The visibility processing unit 16 and the equivalent color-space converter 17 are provided as an example of a first-image generation unit that generates the first image by performing the visibility enhancement process in the first color space.

The color adjustment unit 18 performs the color adjustment on the high visibility image in the equivalent color space so as to change a representative chromaticity $C_s(a_s^*, b_s^*)$ calculated by the representative chromaticity calculation unit 14 to a target chromaticity $C_t(a_t^*, b_t^*)$ that is a skin color perceived as a favorable color by humans. The color adjustment unit 18 thereby generates a color-adjusted image. At this time, the color adjustment unit 18 performs the color adjustment in such a manner as to prevent gradation inversion in a part to undergo the color adjustment.

Hereinafter, such a method will be described specifically.

First, a chromaticity point C(a*,b*) on a line passing through chromaticity points C1(a1*,b1*) and C2(a2*,b2*) is expressed by using a parameter t as illustrated in Formula (10). In the case of t=0, (a*,b*) =(a1*,b1*) holds true. In the case of t=1, (a*,b*) =(a2*, b2*) holds true.

$$\begin{pmatrix} a^* \\ b^* \end{pmatrix} = \begin{pmatrix} a_2^* - a_1^* \\ b_2^* - b_1^* \end{pmatrix} t + \begin{pmatrix} a_1^* \\ b_1^* \end{pmatrix} \quad (10)$$

Figure 4:
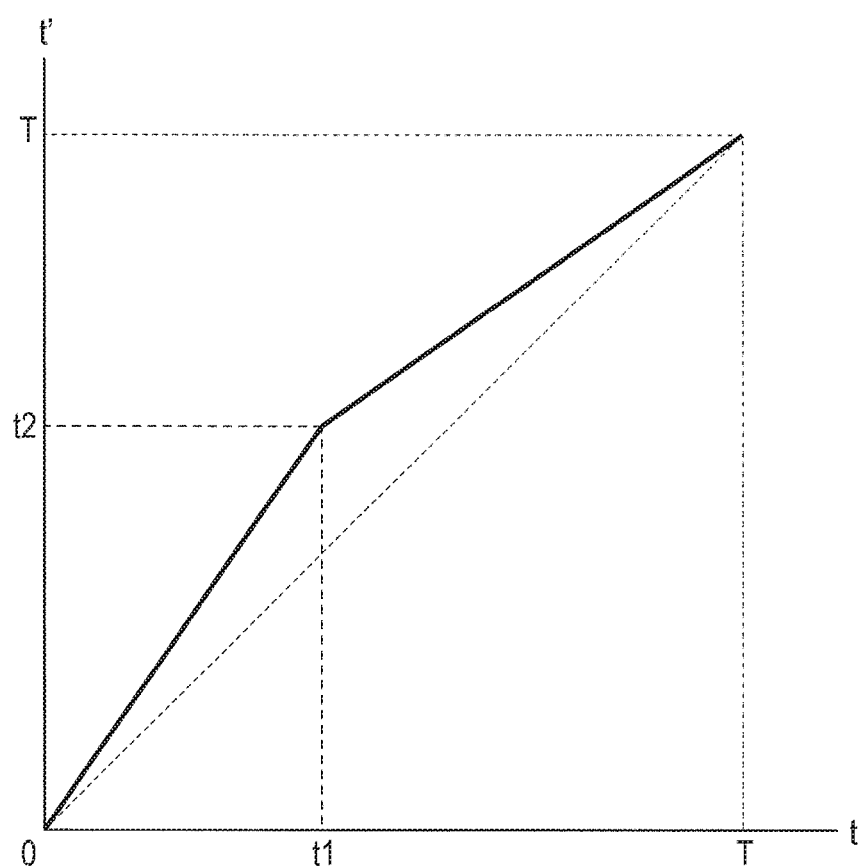
FIG. 4 is a graph illustrating a monotone function used for the color adjustment.

The parameter t as described above is corrected by using a monotone function, and the color adjustment is thereby selectively performed without gradation inversion on the line passing through the chromaticity points $C_1$ and $C_2$. FIG. 4 is a graph illustrating the monotone function used for the color adjustment. On this graph, t on the horizontal axis denotes a parameter for expressing the representative chromaticity $C_s$ calculated by the representative chromaticity calculation unit 14, and t' on the vertical axis is a parameter for expressing the target chromaticity $C_t$. The color adjustment unit 18 uses the graph in such a manner as to use the representative chromaticity $C_s$ calculated by the representative chromaticity calculation unit 14 as a chromaticity exhibited at the time of t=t1 and the target chromaticity $C_t$ as a chromaticity exhibited at the time of t'=t2.

Such a line passing through the chromaticity points $C_1$ and $C_2$ is used as a reference line, and each of the chromaticity points not located on the reference line undergoes the color adjustment in such a manner that a smaller amount of adjustment is used with the increase in distance from the reference line. For example, when the distance from the reference line is d, the distance may be multiplied by a weighting w calculated in accordance with Formula (11). In Formula (11), p is the maximum gradient of the function, and $d_{inf}$ is a parameter for an inflection point of the function.

$$w = \frac{1}{1 + \left(\frac{d}{d_{inf}}\right)^p} \quad (11)$$

The method is not limited to the method described above. As long as a method using another parameter and another conversion function enables selective color adjustment without gradation inversion, the method may be used.

In the exemplary embodiment, the region in which the color adjustment unit 18 is to perform the processing is used as an example of a second region, and the color-adjusted image is used as an example of the second image. The color adjustment unit 18 is provided as an example of a second-image generation unit that generates a second image by performing, in the second color space, a process for adjusting the color values of pixels in the second region.

The color-space inverse converter 19 converts the color-adjusted image generated by the color adjustment unit 18 into an image in the RGB space that is the color space of the original image and outputs the RGB image as an output image.

Figure 5:
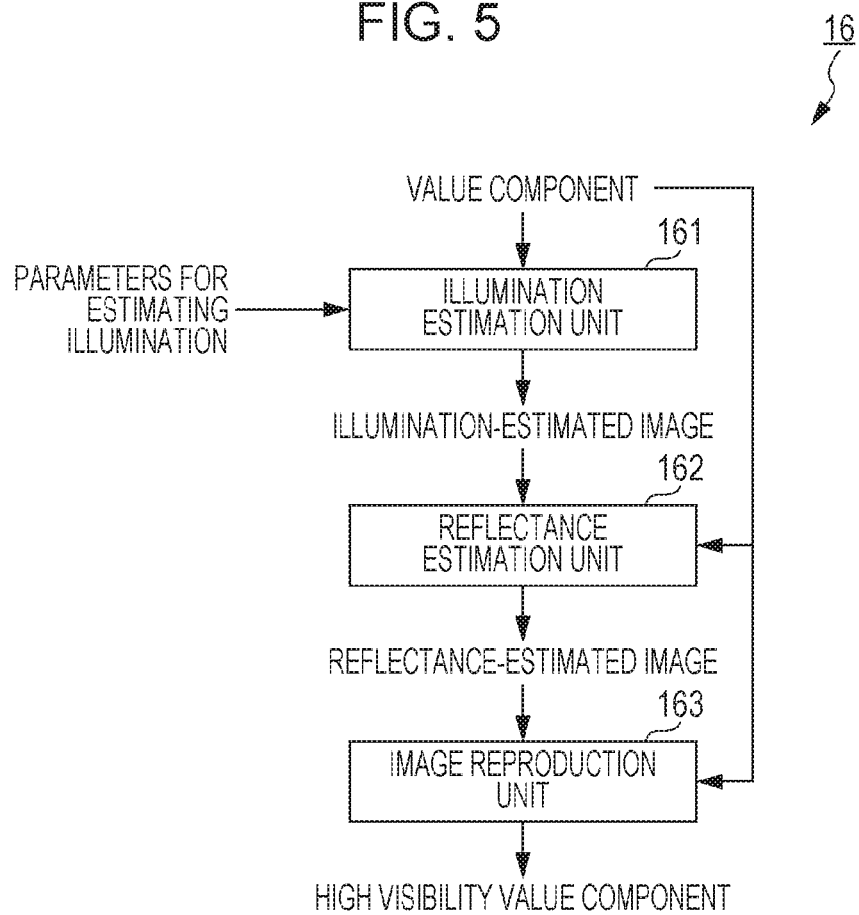
FIG. 5 is a block diagram illustrating an example functional configuration of a visibility processing unit in the exemplary embodiments.

The process performed by the visibility processing unit 16 will be described in detail. FIG. 5 is a block diagram illustrating an example functional configuration of the visibility processing unit 16. As illustrated in FIG. 5, the visibility processing unit 16 includes an illumination estimation unit 161, a reflectance estimation unit 162, and an image reproduction unit 163.

The illumination estimation unit 161 estimates an illuminance component from the value component of the value-chromaticity image generated by the value-chromaticity color-space converter 15.

Various methods are used for estimating the illuminance component. In the exemplary embodiment, an example in which the Gaussian function expressed by Formula (12) is used is described. In Formula (12), i,j denotes the location of a pixel, σ denotes the degree of smoothing (scale), and k denotes a coefficient for normalization performed to obtain a result of 1 in integral calculus based on the number of pixels used as the filter size of image processing.

$$G_{i,j} = k \cdot \exp\left(-\frac{i^2 + j^2}{\sigma^2}\right) \quad (12)$$

One characteristic of human vision is that humans estimate illumination light by using a region around a target region, and the retinex principle is a model based on this.

In the exemplary embodiment, the Gaussian function is used as the function for smoothing, but any function for smoothing may be used. For example, a bilateral filter may be used.

Further, the smoothing may be performed using a layer with one scale and may also be performed using multiple layers (multi-scales) with mutually different scales to increase the robustness in the illuminance component estimation. For example, to estimate the illuminance component, a weighted mean in a multi-layer image with scales 1 to N is desirably calculated as described in Formula (13).

$$L_{i,j} = \sum_{n=1}^{N} W_n G_{n_{i,j}} \otimes I_{i,j} \quad (13)$$

Note that $L_{i,j}$ denotes a pixel value in an image having estimated illumination (hereinafter, referred to as a "illumination-estimated image"), $G_{n_{i,j}}$ denotes the Gaussian function for a scale n, $I_{i,j}$ denotes the value component of the original image, $W_n$ denotes a weighting for the scale n, and a symbol expressed using a cross enclosed with a circle denotes convolution. Note that $W_n$ may simply be 1/N or may be variable in accordance with the layer. At least one scale may be provided, or multiple scales may be provided to select one of the scales.

The reflectance estimation unit 162 estimates the reflectance of the original image on the basis of a ratio between each pixel value in the illumination-estimated image acquired by the illumination estimation unit 161 and the value component of the original image. Specifically, in accordance with Formula (14) where the value component of the original image is $I_{i,j}$ and where the pixel value in the illumination-estimated image is $L_{i,j}$, the reflectance estimation unit 162 estimates a pixel value $R_{i,j}$ in an image having estimated reflectance (hereinafter, referred to as a "reflectance-estimated image").

$$R_{i,j} = \frac{I_{i,j}}{L_{i,j}} \quad (14)$$

The image reproduction unit 163 acquires the value component of the high visibility image by performing a process for enhancing a reflectance component on the basis of the pixel value in the reflectance-estimated image acquired by the reflectance estimation unit 162 and the value component of the original image. The process for enhancing a reflectance component may be performed, for example, in accordance with Formula (15).

$$I'_{i,j} = \alpha R_{i,j} + (1-\alpha) I_{i,j} \quad (15)$$

Note that $I'_{i,j}$ denotes the value component of the high visibility image, and α is a visibility parameter for controlling the degree of the visibility enhancement. Note that α=1 leads to the reflectance component itself, and α=0 leads to the original image. Since the visibility parameter is a design element, α may take on any value ranging from 0 to 1. In addition, to reproduce an image, any method that does not depart from the essence of the exemplary embodiment may be used.

The example using the process for enhancing visibility on the basis of the retinex principle has herein been described. However, another process for enhancing visibility may be used as long as disassembly into the illumination light component and the reflectance component is performed in the process.

In the exemplary embodiment, the example in which the visibility process is performed in the HSV color space has been described. However, the visibility process may be performed in another color space not prone to having pixel values that fall outside the color gamut as a result of conversion of pixel values performed in the visibility process causing change in value or lightness. Also in the exemplary embodiment, the example in which the color adjustment is performed in the CIE Lab color space has been described. However, the color adjustment may be performed in another color space as long as the color space is generated with human perception taken into consideration like the equivalent color space and is suitable for the color adjustment. In the exemplary embodiment as described above, these processes are performed in the color spaces suitable for the respective processes.

Second Exemplary Embodiment

Figure 6:
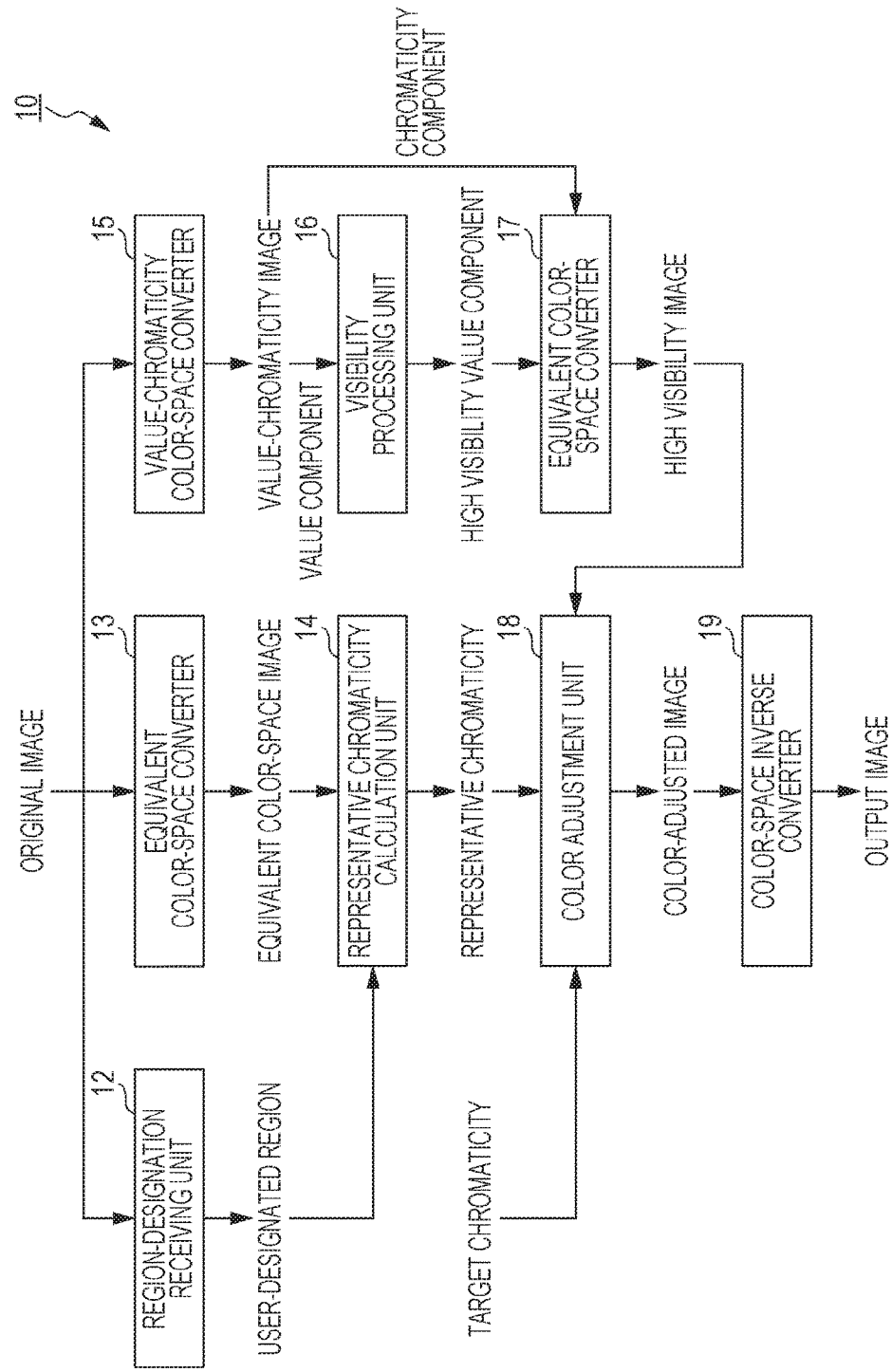
FIG. 6 is a block diagram illustrating an example functional configuration of an image processing apparatus in a second exemplary embodiment.

FIG. 6 is a block diagram illustrating an example functional configuration of an image processing apparatus 10 in a second exemplary embodiment. Also in the second exemplary embodiment as in the first exemplary embodiment, color reproduction is appropriately performed in the region corresponding to the skin of the subject with memory color taken into consideration, and the visibility is also enhanced. Also in the second exemplary embodiment, particularly the case of calculating the representative chromaticity only from the original image is described, but the second exemplary embodiment is different from the first exemplary embodiment in that the user designates the skin region. As illustrated in FIG. 6, the image processing apparatus 10 in the second exemplary embodiment includes a region-designation receiving unit 12, the equivalent color-space converter 13, the representative chromaticity calculation unit 14, the value-chromaticity color-space converter 15, the visibility processing unit 16, the equivalent color-space converter 17, the color adjustment unit 18, and the color-space inverse converter 19. The components other than the region-designation receiving unit 12 and the representative chromaticity calculation unit 14 are the same as those in the first exemplary embodiment, and description thereof is thus omitted. Only the region-designation receiving unit 12 and the representative chromaticity calculation unit 14 will be described.

The region-designation receiving unit 12 receives designation of a region performed by the user on the RGB image that is the original image and identifies the region designated by the user (hereinafter, referred to as a "user-designated region"). For example, when the user designates a regen corresponding to the skin of the subject directly or by using a region extraction process using a general cutout algorithm such as graph cuts, the region-designation receiving unit 12 receives the designation and identifies the user-designated region. Like the skin-region detection unit 11 in the first exemplary embodiment, the region-designation receiving unit 12 outputs Boolean values indicating whether pixels belong to the user-designated region or weightings $w_{i,j}$ each indicating the degree to which the corresponding pixel belongs to the user-designated region.

In the exemplary embodiment, the region-designation receiving unit 12 is provided as an example of the region determination unit that determines the first region as a region designated by an operator.

The representative chromaticity calculation unit 14 calculates the representative chromaticity $C_s$ from the chromaticities $C(a^*,b^*)$ of the pixels in the equivalent color-space image. The representative chromaticity calculation unit 14 in the second exemplary embodiment is different from that in the first exemplary embodiment only in that the representative chromaticity calculation unit 14 receives, from the region-designation receiving unit 12, Boolean values indicating whether the pixels belong to the user-designated region or the weightings each indicating the degree to which the corresponding pixel belongs to the user-designated region.

In the exemplary embodiment, the region in which the representative chromaticity calculation unit 14 is to perform the processing is used as an example of the first region that is the entirety or a part of the image. The representative chromaticity calculation unit 14 is provided as an example of the representative chromaticity determination unit that determines the representative chromaticity that represents the chromaticities of the pixels in the first region.

Third Exemplary Embodiment

Figure 7:
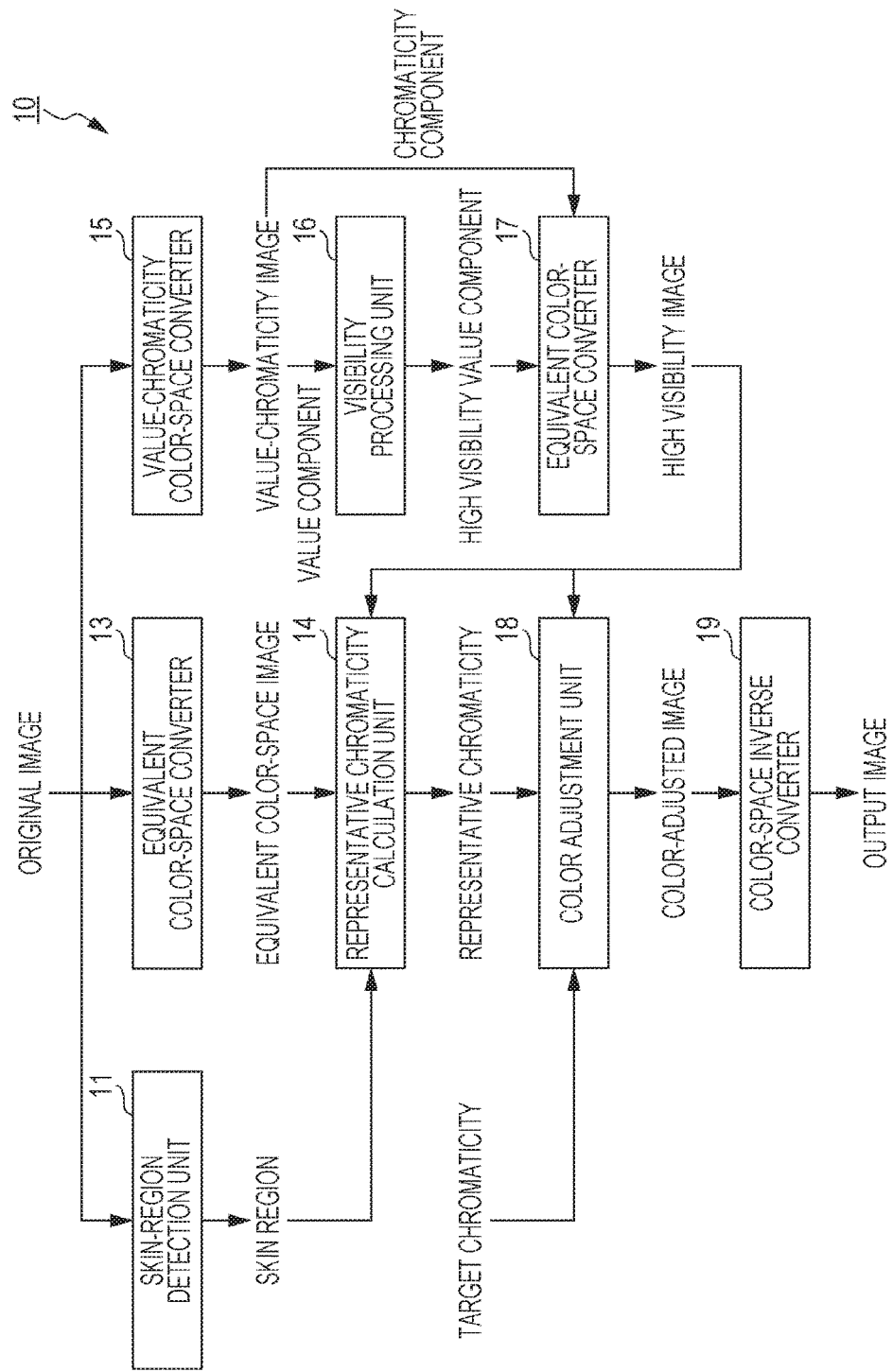
FIG. 7 is a block diagram illustrating an example functional configuration of an image processing apparatus in a third exemplary embodiment.

FIG. 7 is a block diagram illustrating an example functional configuration of an image processing apparatus 10 in a third exemplary embodiment. As illustrated in FIG. 7, the image processing apparatus 10 in the third exemplary embodiment includes, as in the first exemplary embodiment, the skin-region detection unit 11, the equivalent color-space converter 13, the representative chromaticity calculation unit 14, the value-chromaticity color-space converter 15, the visibility processing unit 16, the equivalent color-space converter 17, the color adjustment unit 18, and the color-space inverse converter 19. However, in the third exemplary embodiment, the representative chromaticity calculation unit 14 also uses the high visibility image acquired in such a manner that the visibility processing unit 16 performs the visibility process and that the equivalent color-space converter 17 converts the value-chromaticity image into the equivalent color space. The components other than the representative chromaticity calculation unit 14 are the same as those in the first exemplary embodiment, and description thereof is thus omitted. Only the representative chromaticity calculation unit 14 will be described.

The representative chromaticity calculation unit 14 calculates a representative chromaticity $C_{s1}$ from the chromaticities $C_1(a^*,b^*)$ of the pixels in the equivalent color-space image. Specifically, when receiving the Boolean values indicating whether the pixels belong to the skin region from the skin-region detection unit 11, the representative chromaticity calculation unit 14 may calculate, as in Formula (16), a mean (arithmetic mean) of the chromaticities $C_1(a^*, b^*)$ of the pixels in the skin region in the equivalent color-space image and may set the value as the representative chromaticity $C_{s1}$.

The representative chromaticity calculation unit 14 also calculates a representative chromaticity $C_{s2}$ from the chromaticities $C_2(a^*,b^*)$ of the pixels in the high visibility image. Specifically, when receiving the Boolean values indicating whether the pixels belong to the skin region from the skin-region detection unit 11, the representative chromaticity calculation unit 14 may calculate, as in Formula (17), a mean (arithmetic mean) of the chromaticities $C_2(a^*, b^*)$ of the pixels in the skin region in the high visibility image and may set the value as the representative chromaticity $C_{s2}$.

$$C_{s2} = \frac{\sum_{s2} C_2(a*, b*)}{n_{s2}} \quad (17)$$

In Formulas (16) and (17), $\Sigma_{s1}$ and $\Sigma_{s2}$ each represent the summation of the pixels in the skin region, and $n_{s1}$ and $n_{s2}$ each denote the number of pixels in the skin region.

The representative chromaticity calculation unit 14 calculates the representative chromaticity $C_s$ by using a fixed parameter $\beta$ ($0 \leq \beta \leq 1$) in accordance with Formula (18).

$$C_s = \beta C_{s1} + (1-\beta)C_{s2} \quad (18)$$

This indicates that the representative chromaticity of the original image is used because $\beta=1$ leads to $C_s=C_{s1}$ and that the representative chromaticity of the high visibility image is used because $\beta=0$ leads to $C_s=C_{s2}$.

For example, if there is a small amount of change from the chromaticities of the respective pixels in the entirety or a part of the original image to the chromaticities of the respective pixels in the entirety or a part of the high visibility image, the representative chromaticity $C_{s1}$ may be used based on $\beta=1$. If there is a large amount of change from the chromaticities of the respective pixels in the entirety or a part of the original image to the chromaticities of the respective pixels in the entirety or a part of the high visibility image, the representative chromaticity $C_{s2}$ may be used based on $\beta=0$. Note that "there is a small amount of change" indicates that, for example, the amount of change is smaller than a threshold $Th_1$, and "there is a large amount of change" indicates that, for example, the amount of change is larger than a threshold $Th_2$. The threshold $Th_2$ may be set larger than the threshold $Th_1$ or equal to the threshold $Th_1$. In this case, the representative chromaticity $C_{s1}$ is an example of the representative chromaticity that represents the chromaticities of the pixels in the first region of the original image, and the representative chromaticity $C_{s2}$ is an example of the representative chromaticity that represents the chromaticities of the pixels in the first region of the first image. The threshold $Th_1$ is an example of a first threshold, and the threshold $Th_2$ is an example of a second threshold.

Alternatively, when receiving the weightings $w_{i,j}$ each indicating the degree to which the corresponding pixel belongs to the skin region from the skin-region detection unit 11, the representative chromaticity calculation unit 14 may calculate the representative chromaticities $C_{s1}$ and $C_{s2}$ by obtaining a weighted mean by using the weightings $w_{i,j}$ as in Formulas (19) and (20).

$$C_{s1} = \frac{\sum_{s1} C_1(a*, b*)}{n_{s1}} \quad (16)$$

$$C_{s1} = \frac{\sum_{s1} (w_{i,j} C_1(a*, b*))}{\sum_{s1} w_{i,j}} \quad (19)$$

$$C_{s2} = \frac{\sum_{s2} (w_{i,j} C_2(a*, b*))}{\sum_{s2} w_{i,j}} \quad (20)$$

In Formulas (19) and (20), $\Sigma_{s1}$ and $\Sigma_{s2}$ each represent the summation of the pixels in the skin region.

The representative chromaticity calculation unit 14 may calculate the representative chromaticity $C_s$ by using these representative chromaticities $C_{s1}$ and $C_{s2}$ in accordance with Formula (18).

For example, the degree of use of the representative chromaticity $C_{s1}$ may be increased in such a manner that β is increased with the decrease in the amount of change from the chromaticities of the respective pixels in the entirety or a part of the original image to the chromaticities of the respective pixels in the entirety or a part of the high visibility image. The degree of use of the representative chromaticity $C_{s2}$ may be increased in such a manner that β is decreased with the increase in the amount of change from the chromaticities of the respective pixels in the entirety or a part of the original image to the chromaticities of the respective pixels in the entirety or a part of the high visibility image. In this case, the representative chromaticity $C_{s1}$ is an example of a first representative chromaticity that represents the chromaticities of the pixels in the first region of the original image, and the representative chromaticity $C_{s2}$ is an example of a second representative chromaticity that represents the chromaticities of the pixels in the first region of the first image. In addition, β is an example of the weighting of the first representative chromaticity.

As described above, if the Boolean values indicating whether the pixels belong to the skin region are delivered from the skin-region detection unit 11, the region in which the representative chromaticity calculation unit 14 is to perform the processing is part of the image. If the weightings $w_{i,j}$ each indicating the degree to which the corresponding pixel belongs to the skin region are delivered from the skin-region detection unit 11, the region in which the representative chromaticity calculation unit 14 is to perform the processing is the entirety of the image. That is, in the exemplary embodiment, the region in which the representative chromaticity calculation unit 14 is to perform the processing is used as an example of the first region that is the entirety or a part of the image. The representative chromaticity calculation unit 14 is provided as an example of the representative chromaticity determination unit that determines the representative chromaticity that represents the chromaticities of the pixels in the first region.

Note that β is a fixed value in the description above, but β may be a value predetermined in a program or a value designated by the user at the time of processing.

Fourth Exemplary Embodiment

Figure 8:
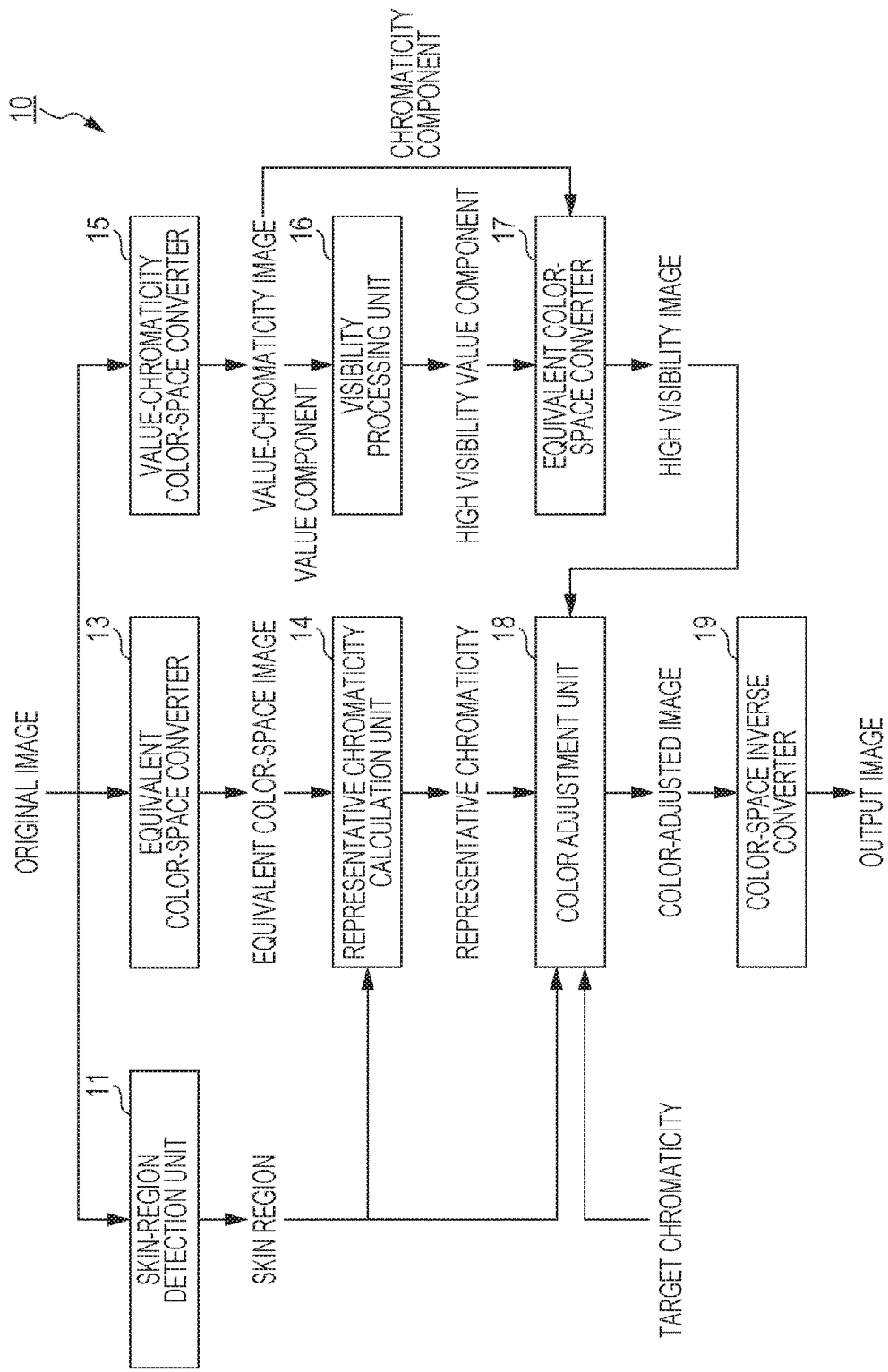
FIG. 8 is a block diagram illustrating an example functional configuration of an image processing apparatus in a fourth exemplary embodiment.

FIG. 8 is a block diagram illustrating an example functional configuration of an image processing apparatus 10 in a fourth exemplary embodiment. As illustrated in FIG. 8, the image processing apparatus 10 in the fourth exemplary embodiment includes, as in the first exemplary embodiment, the skin-region detection unit 11, the equivalent color-space converter 13, the representative chromaticity calculation unit 14, the value-chromaticity color-space converter 15, the visibility processing unit 16, the equivalent color-space converter 17, the color adjustment unit 18, and the color-space inverse converter 19. However, in the fourth exemplary embodiment, the color adjustment unit 18 also uses the information regarding the skin region detected by the skin-region detection unit 11. The components other than the color adjustment unit 18 are the same as those in the first exemplary embodiment, and description thereof is thus omitted. Only the color adjustment unit 18 will be described.

As described above in the first exemplary embodiment, the color adjustment unit 18 performs the color adjustment on the high visibility image in the equivalent color space so as to change a representative chromaticity $C_s(a_s^*, b_s^*)$ calculated by the representative chromaticity calculation unit 14 toward a target chromaticity $C_t(a_t^*, b_t^*)$ that is a skin color perceived as a favorable color by humans. The color adjustment unit 18 thereby generates a color-adjusted image. However, when receiving the Boolean values indicating whether the pixels belong to the skin region from the skin-region detection unit 11 at this time, the color adjustment unit 18 performs the color adjustment on only pixels belonging to the skin region in the high visibility image.

Alternatively, when receiving the weightings $w_{i,j}$ each indicating the degree to which the corresponding pixel belongs to the skin region from the skin-region detection unit 11, the color adjustment unit 18 performs the color adjustment in accordance with the weightings $w_{i,j}$. For example, consider a case where, in FIG. 4, the horizontal axis represents a chromaticity value $I_{i,j}(t)$ in the original image, the vertical axis represents a chromaticity value $I'_{i,j}(t)$ in the high visibility image, and the function is $F(I_{i,j}(t))$. In this case, the color adjustment may be performed in accordance with Formula (21).

$$I'_{i,j}(t) = w_{i,j} F(I_{i,j}(t)) \quad (21)$$

As described above, if the Boolean values indicating whether the pixels belong to the skin region are delivered from the skin-region detection unit 11, a region in which the color adjustment unit 18 is to perform the processing is part of the image. If the weightings $w_{i,j}$ each indicating the degree to which the corresponding pixel belongs to the skin region are delivered from the skin-region detection unit 11, the region in which the color adjustment unit 18 is to perform the processing is the entirety of the image. That is, in the exemplary embodiment, the region in which the color adjustment unit 18 is to perform the processing is used as an example of the second region that is the entirety or a part of the image. The color-adjusted image is used as an example of the second image. The color adjustment unit 18 is provided as an example of the second-image generation unit that generates the second image by performing, in the second color space, the process for adjusting the color values of the pixels in the second region.

Modifications

In the first, third, and fourth exemplary embodiments, the representative chromaticity calculation unit 14 calculates the representative chromaticity from the skin region detected by the skin-region detection unit 11. In the second exemplary embodiment, the representative chromaticity calculation unit 14 calculates the representative chromaticity from the user-designated region identified by the region-designation receiving unit 12. However, the representative chromaticity calculation unit 14 may calculate the representative chromaticity from, for example, the entirety of the image, not from any one of the skin region detected by the skin-region detection unit 11 and the user-designated region identified by the region-designation receiving unit 12.

The color adjustment unit 18 performs the color adjustment in the entirety of the image in the first to third exemplary embodiments and performs the color adjustment in the skin region detected by the skin-region detection unit 11 in the fourth exemplary embodiment. However, the color adjustment unit 18 may perform the color adjustment in the user-designated region identified by the region-designation receiving unit 12.

The region used by the representative chromaticity calculation unit 14 to calculate the representative chromaticity and the region used by the color adjustment unit 18 to perform the color adjustment may be determined independently from each other. For example, even if the representative chromaticity calculation unit 14 calculates the representative chromaticity from the skin region detected by the skin-region detection unit 11, the color adjustment unit 18 does not have to perform the color adjustment in the skin region detected by the skin-region detection unit 11. The color adjustment unit 18 may perform the color adjustment in the entirety of the image. The color adjustment unit 18 may also perform the color adjustment in the user-designated region identified by the region-designation receiving unit 12.

Operation of Image Processing Apparatus

Figure 9:
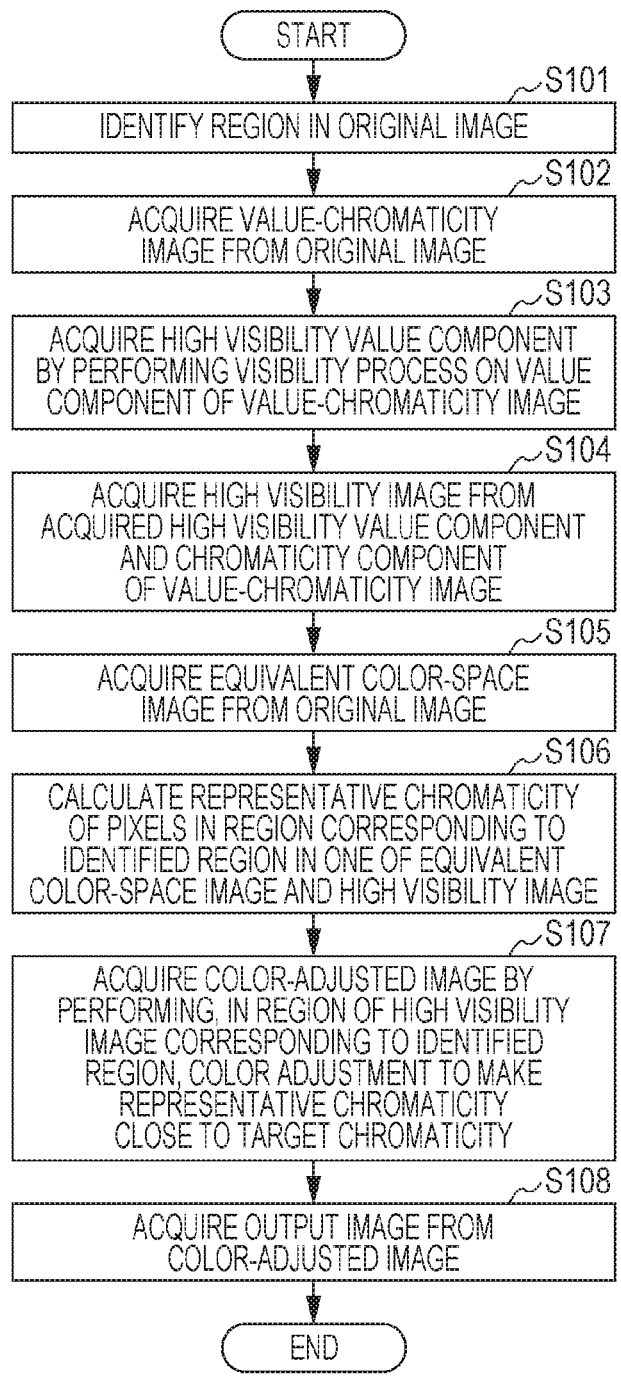
FIG. 9 is a flowchart illustrating example operation of the image processing apparatus in the exemplary embodiments.

FIG. 9 is a flowchart illustrating example operation of the image processing apparatus 10 in each exemplary embodiment. In the operation example, the region used by the representative chromaticity calculation unit 14 to calculate the representative chromaticity is the same as the region used by the color adjustment unit 18 to perform the color adjustment.

When the original image is input, a region in the original image is first identified (step S101). Specifically, as in the first, third, and fourth exemplary embodiments, the skin-region detection unit 11 may identify the skin region on the basis of the degree of color difference from the reference skin color. Alternatively, as in the second exemplary embodiment, the region-designation receiving unit 12 may identify the user-designated region on the basis of the user operation. The region identified in the image may be the entirety of the image. In this case, step S101 does not have to be performed.

The value-chromaticity color-space converter 15 converts the color space of the original image into a value-chromaticity color space and thereby acquires a value-chromaticity image (step S102).

The visibility processing unit 16 performs the visibility process on a value component of the value-chromaticity image acquired in step S102 and thereby acquires a high visibility value component (step S103).

The equivalent color-space converter 17 acquires a high visibility image by converting the color space of the image having the high visibility value component acquired in step S103 and the chromaticity component of the value-chromaticity image acquired in step S102 into an equivalent color space (step S104).

The equivalent color-space converter 13 acquires an equivalent color-space image by converting the color space of the original image into the equivalent color space (step S105).

The representative chromaticity calculation unit 14 calculates the representative chromaticity that represents the chromaticities of pixels in a region that corresponds to the identified region and is included in one of the equivalent color-space image acquired in step S105 and the high visibility image acquired in step S104 (step S106). The identified region is the region identified in step S101. The identified region may be the skin region identified by the skin-region detection unit 11 as in the first, third, and fourth exemplary embodiments, may be the user-designated region identified by the region-designation receiving unit 12 as in the second exemplary embodiment, and may be the entirety of the image.

The color adjustment unit 18 acquires a color-adjusted image by performing the color adjustment in the region that corresponds to the identified region and is included in the high visibility image acquired in step S104 (step S107). The color adjustment is performed to make the representative chromaticity close to the target chromaticity. Also in step S107, the identified region is also the region identified in step S101. The identified region may be the skin region identified by the skin-region detection unit 11 as in the first, third, and fourth exemplary embodiments, may be the user-designated region identified by the region-designation receiving unit 12 as in the second exemplary embodiment, and may be the entirety of the image.

The color-space inverse converter 19 acquires an output image by performing inverse color conversion from the color space of the color-adjusted image acquired in step S107 into the color space of the original image (step S108).

Hardware Configuration of Image Processing Apparatus

The image processing apparatus 10 in each exemplary embodiment may be implemented, for example, by image processing software installed in a personal computer but may be implemented typically by the image processing apparatus 10 that reads and forms an image.

Figure 10:
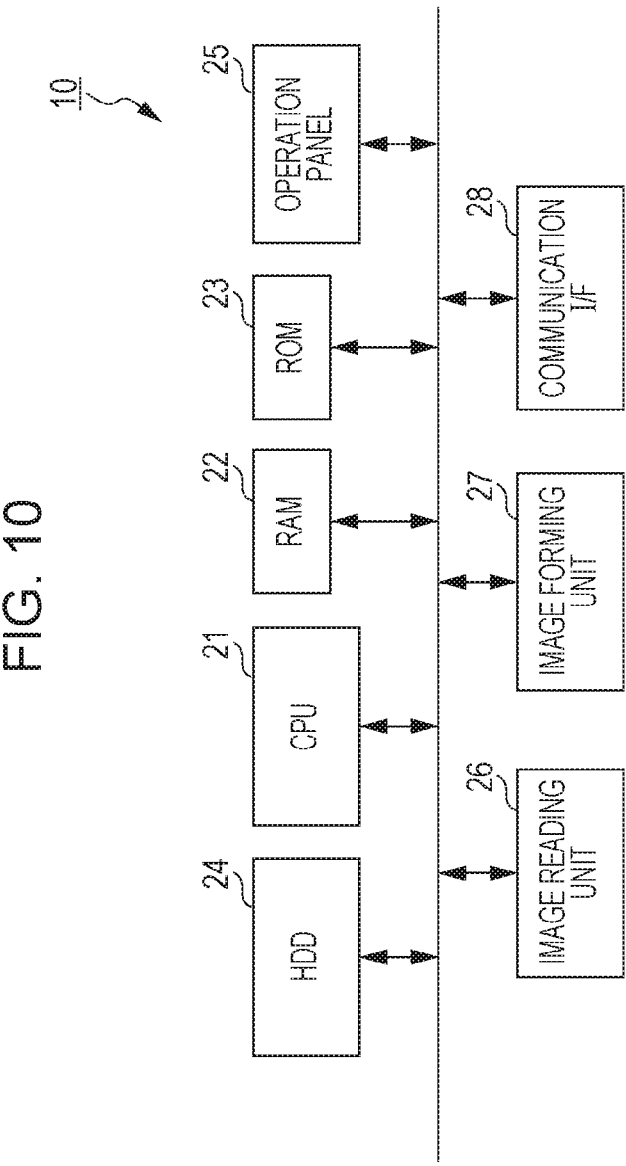
FIG. 10 is a block diagram illustrating an example hardware configuration of the image processing apparatus in the exemplary embodiments.

FIG. 10 is a diagram illustrating an example hardware configuration of the image processing apparatus 10 as described above. As illustrated in FIG. 10, the image processing apparatus 10 includes a central processing unit (CPU) 21, a random access memory (RAM) 22, a read only memory (ROM) 23, a hard disk drive (HDD) 24, an operation panel 25, an image reading unit 26, an image forming unit 27, and a communication interface (hereinafter, referred to as a communication I/F) 28.

The CPU 21 implements functions (described later) by loading various programs stored in the ROM 23 or the like into the RAM 22 and by running the programs.

The RAM 22 is used as a work memory or the like for the CPU 21.

The ROM 23 stores the various programs run by the CPU 21.

The HDD 24 stores image data read by the image reading unit 26, image data used for forming an image in the image forming unit 27, and the like. The HDD 24 is for example, a magnetic disk device.

The operation panel 25 is a touch panel that displays various pieces of information and receives input operations performed by the user. The operation panel 25 includes a display that displays the various pieces of information and a location detection sheet that detects a location designated using a finger, a stylus pen, or the like.

The image reading unit 26 reads an image recorded on a recording medium such as paper. The image reading unit 26 is, for example, a scanner. A charge coupled device (CCD) scanner and a contact image sensor (CIS) sensor may be used. The CCD scanner receives light in such a manner that the light is radiated from a light source, reflected on a document, and reduced by a lens. The CIS scanner receives light in such a manner that light beams are serially radiated from a light emitting diode (LED) light source and reflected on a document.

The image forming unit 27 forms an image on a recording medium. The image forming unit 27 is, for example, a printer. An electrophotographic printer and an inkjet printer may be used. The electrophotographic printer forms an image in such a manner that toner caused to attach to a photoconductor is transferred onto a recording medium. The inkjet printer forms an image in such a manner that ink is discharged onto a recording medium.

The communication I/F 28 transmits and receives various pieces of information to and from another device through a network.

The program by which the exemplary embodiment is implemented may be provided not only by using a communication unit but also in such a manner as to be stored in a recording medium such as a compact disc read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a first-image generation unit configured to generate a first image by performing a visibility enhancement process for enhancing visibility of a subject in an original image, the visibility enhancement process being performed on the original image in a first color space that is a color space not prone to having color values that fall outside a color gamut as a result of conversion of color values of pixels in the original image performed in the visibility enhancement process;
   a representative chromaticity determination unit configured to determine a representative chromaticity that represents chromaticities of pixels in a first region that is an entirety or a part of one of the original image and the first image;
   a second-image generation unit configured to generate a second image by performing, in a second color space that is an equivalent color space, a process for adjusting color values of pixels in a second region that is the entirety or the part of the first image to make the representative chromaticity close to a target chromaticity; and
   a region determination unit configured to determine one of the first region and the second region as a region including a pixel having a color value within a predetermined range from a color value of a memory color.

2. The image processing apparatus according to claim 1, further comprising:
   a region determination unit configured to determine one of the first region and the second region as a region designated by an operator.

3. The image processing apparatus according to claim 1, wherein the representative chromaticity determination unit determines the representative chromaticity as an arithmetic mean value or a weighted mean value of the chromaticities of the pixels in the first region.

4. The image processing apparatus according to claim 1, wherein the representative chromaticity determination unit determines the representative chromaticity in the second color space.

5. The image processing apparatus according to claim 1, wherein if an amount of change from the chromaticities of the pixels in the original image to the chromaticities of a corresponding one of the pixels in the first image is smaller than a first threshold, the representative chromaticity determination unit determines the representative chromaticity that represents the chromaticities of the corresponding one of the the pixels in the first region of the original image, and if the amount of the change is larger than a second threshold that is equal to or larger than the first threshold, the representative chromaticity determination unit determines the representative chromaticity that represents the chromaticities of the corresponding one of the the pixels in the first region of the first image.

6. The image processing apparatus according to claim 1, wherein the representative chromaticity determination unit determines the representative chromaticity that is a weighted sum of a first representative chromaticity and a second representative chromaticity, the first representative chromaticity representing the chromaticities of the pixels in the first region of the original image, the second representative chromaticity representing the chromaticities of the pixels in the first region of the first image, the representative chromaticity determination unit determining the representative chromaticity such that a weighting of the first representative chromaticity is increased with a decrease in the amount of change from the chromaticities of the pixels in the original image to the chromaticities of the pixels in the first image.

7. A non-transitory computer readable medium storing a program causing a computer to execute a process for image processing, the process comprising:
   generating a first image by performing a visibility enhancement process for enhancing visibility of a subject in an original image, the visibility enhancement process being performed on the original image in a first color space that is a color space not prone to having color values that fall outside a color gamut as a result of conversion of color values of pixels in the original image performed in the visibility enhancement process;
   determining a representative chromaticity that represents chromaticities of pixels in a first region that is an entirety or a part of one of the original image and the first image;
   generating a second image by performing, in a second color space that is an equivalent color space, a process for adjusting color values of pixels in a second region that is the entirety or the part of the first image to make the representative chromaticity close to a target chromaticity; and
   determining one of the first region and the second region as a region including a pixel having a color value within a predetermined range from a color value of a memory color.

8. An image processing method comprising:
   generating a first image by performing a visibility enhancement process for enhancing visibility of a subject in an original image, the visibility enhancement process being performed on the original image in a first color space that is a color space not prone to having color values that fall outside a color gamut as a result of conversion of color values of pixels in the original image performed in the visibility enhancement process;

determining a representative chromaticity that represents chromaticities of pixels in a first region that is an entirety or a part of one of the original image and the first image; and generating a second image by performing, in a second color space that is an equivalent color space, a process for adjusting color values of pixels in a second region that is the entirety or the part of the first image to make the representative chromaticity close to a target chromaticity; and determining one of the first region and the second region as a region including a pixel having a color value within a predetermined range from a color value of a memory color.

* * * * *